United States Patent [19]

Ikeda

[11] Patent Number: 4,661,943
[45] Date of Patent: Apr. 28, 1987

[54] OPTICAL DATA READER

[75] Inventor: Atsuo Ikeda, Saitama, Japan

[73] Assignee: Pioneer Electroni Corporation, Tokyo, Japan

[21] Appl. No.: 706,414

[22] Filed: Feb. 27, 1985

[30] Foreign Application Priority Data

Feb. 27, 1984 [JP] Japan .............................. 59-27043[U]

[51] Int. Cl.$^4$ ........................................... G11B 7/135
[52] U.S. Cl. ..................................................... 369/44
[58] Field of Search ..................... 369/44, 45, 46, 111; 250/201

[56] References Cited

U.S. PATENT DOCUMENTS

| | | | |
|---|---|---|---|
| 4,236,232 | 11/1980 | Jansen et al. | 369/44 |
| 4,449,213 | 5/1984 | Noborimoto et al. | 369/45 |
| 4,555,780 | 11/1985 | Koide | 369/45 |
| 4,589,103 | 5/1986 | Tajima | 369/46 |

Primary Examiner—Donald McElheny, Jr.
Attorney, Agent, or Firm—Sughrue, Mion, Zinn Macpeak & Seas

[57] ABSTRACT

An optical data reader having an improved servo system for maintaining an orthogonal relation between the optical axis of an irradiating light beam and the surface of a recording disc onto which the light beam is directed. The data reader includes a holding mechanism for the optical system, movable in the radial direction of the disc, and a tilt servomechanism. The tilt servomechanism includes flexible members for supporting an objective lens of the optical system of the reader so as to be rotatable and movable in a plane including the rotational axis of the disc, a detector for detecting deviation from the orthogonal, and a drive device for moving the objective lens in accordance with the detection signal.

6 Claims, 7 Drawing Figures

OPTICAL DATA READER

BACKGROUND OF THE INVENTION

The present invention relates to an optical data reader, and more particularly, to an optical data reader provided with a servo system which maintains an orthogonal relation between the recording surface of a disk forming a recording medium and the optical axis of an irradiating light beam directed onto the recording surface.

If there is a significant deviation from an orthogonal relation between the recording surface of a disc and the optical axis of the irradiating light beam, the shape of the pick-up spot converged on the recording tracks of the disc will be distorted, and therefore data from the adjacent tracks may "leak" into the output signal of the pickup, that is, cross-talk may occur. A major cause of such deviation is due to a basin-like distortion of the disc which occurs upon cooling of the disc following its molding.

Manufacturing standards for optical data recording discs include tolerance limits on the amount of the basin-like distortion. Typical values of such tolerance limits are, for example, −2.5 to +1.5 mm for discs having an outer diameter of 20 to 30 cm and +0.5 to −0.5 cm for discs having an outer diameter of about 12 cm.

Often optical data readers are provided with tilt servomechanisms for maintaining the orthogonal relationship between the optical axis of the irradiating light beam directed onto the recording surface of the disc and the surface of the disc in order to reduce the amount of cross talk. The present applicant has previously proposed such an optical data reader provided with a tilt servomechanism in Japanese patent application No. 70968/81 (published as Japanese patent Publication No. 186237/82) and as shown in FIG. 1.

With reference to FIG. 1, a recording disc 1 set on a turntable 3 rotated by a spindle motor 2 is pressed to the turntable 3 by a downwardly urged support member 4 and a clamper 5 rotatably supported by the latter. As can be understood from this figure, the disc 1 is deformed into a basin-like shape. On one side of the spindle motor 2 a slide base 6 is movably arranged in the radial direction of the disc 1. A case 7 is pivotally mounted on the slide base 6 through a support shaft 8. In the case 7 is disposed an optical system including an objective lens 9, which directs a laser beam onto the recording surface of the disc, and a detector, which senses the quantity of light reflected from the recording surface. The objective lens 9, which is used for converging the irradiating light beam, having an optical axis 10a, 10b, onto the disc recording surface, is arranged so as to be movable in both the optical axis direction (focusing direction) and the direction normal to the former, that is, in the tracking direction, with respect to the case 7, thereby to be driven in both directions.

Further, the shaft 8 which pivotally supports the case 7 is positioned on an extension of the optical axis 10a, 10b. A holding mechanism for holding the abovementioned optical system is composed of the slide member 6, the case 7, and peripheral small members related thereto.

FIG. 1 shows two conditions, in one of which the above-mentioned holding mechanism is in the position before reproducing, and in the other one of which it is in the reproducing position. A part 11 of the tilt servomechanism is arranged on the pivotable end side of the case 7 on the slide base 6. This tilt servomechanism (only a part of which is shown) includes a support shaft 8, a detector, including a light-emitting element and two light-detecting elements for detecting deviations in the orthogonal relationship between the optical axis 10a, 10b and the recording surface of the disc 1 and producing a detection signal in response thereto; a control section for normally and reversely rotating a drive motor in accordance with the detection signal; a rack member secured to the pivotable end part 7a of the case 7 and extending in the pivoting direction of the pivotable end 7a and formed therein with a rack section extending over substantially the entire length of the rack member; a speed reducing mechanism including a gear meshed with the rack section; and a drive motor for applying drive power to the above-mentione rack section to move the case 7 through the speed reducing mechanism. All of the above-mentioned components, except the detector which is mounted on the case 7, are mounted on the slide base 6.

The operation of the above-described prior art arrangement will now be explained.

If the holding mechanism composed of the slide base 6 and the case 7 moves from its prereproducing position, which the optical axis is illustrated by line 10a, by a predetermined distance and reaches a position below the inclined section of the recording disc 1, the optical axis seen as line 10b and the disc recording surface no longer will have an orthogonal relation therebetween. The above-mentioned detector detects this condition and delivers a detection signal to a control section. The control section rotates the above-mentioned drive motor normally or reversely to reestablish the orthogonal condition between the optical axis 10a, 10b and the disc recording surface.

However, although a nonorthogonal relationship can be corrected, the distance between the disc recording surface and the objective lens 9 changes from A to B, as indicated in FIG. 1, after this correction to the orthogonal relationship. Therefore, the objective lens 9 must be displaced parallel to the optical axis (corresponding to A–B) to converge the irradiating light beam onto the disc recording surface.

Moreover, as mentioned above, the prior art tilt servomechanism has a large number of component parts, and therefore is very expensive.

SUMMARY OF THE INVENTION

The present invention has been achieved in view of the above-mentioned problems of the prior art.

Accordingly, an object of the present invention is to provide an optical data reader provided with a tilt servo mechanism which has a small number of components and is therefore low in cost.

A optical data reader according to the present invention comprises an optical system including an objective lens, a holding mechanism for holding the optical system and being movable radially of a recording disc, a tilt servomechanism for maintaining the orthogonal relation between the optical axis of irradiating light beam directed onto the disc and the surface of the disc, wherein the tilt servomechanism further comprises support means provided on the holding mechanism and supporting the objective lens and which is rotatably and parallely movable in a plane including the rotational axis of the recording disc; means for detecting the relative angle between the optical axis of the irradiating light beam and the recording surface of the disc and issuing a detection signal in response thereto; and drive means for driving the objective lens in accordance with the detection signal.

DESCRIPTION OF THE PREFERRED EMBODIMENTS

An optical data reader constructed in accordance with the present invention will be explained hereinunder with reference to FIG. 2 to FIG. 5.

Figure 1:
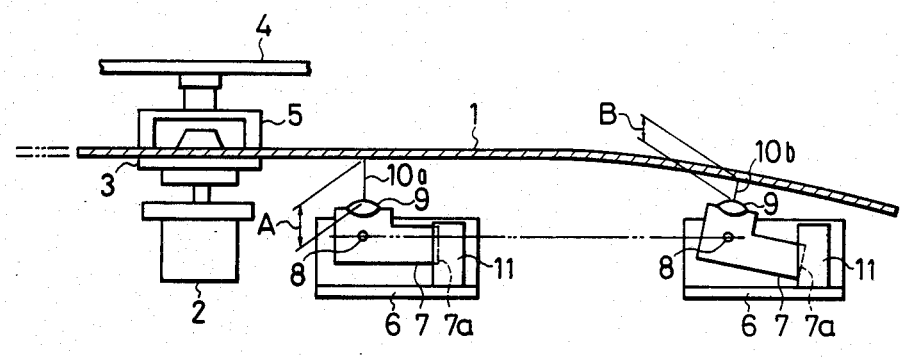
FIG. 1 is a schematic side view illustrating essential parts of a conventional optical data reader.
Figure 2:
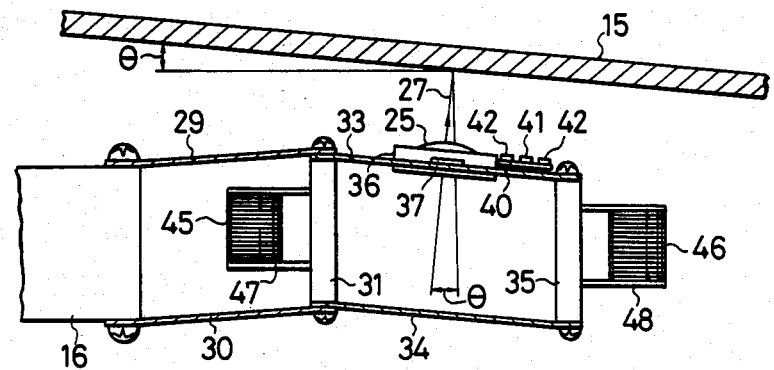
FIGS. 2 and 3 are a sectional side and a perspective view, respectively, of an optical data reader of a preferred embodiment of the present invention.
Figure 4:
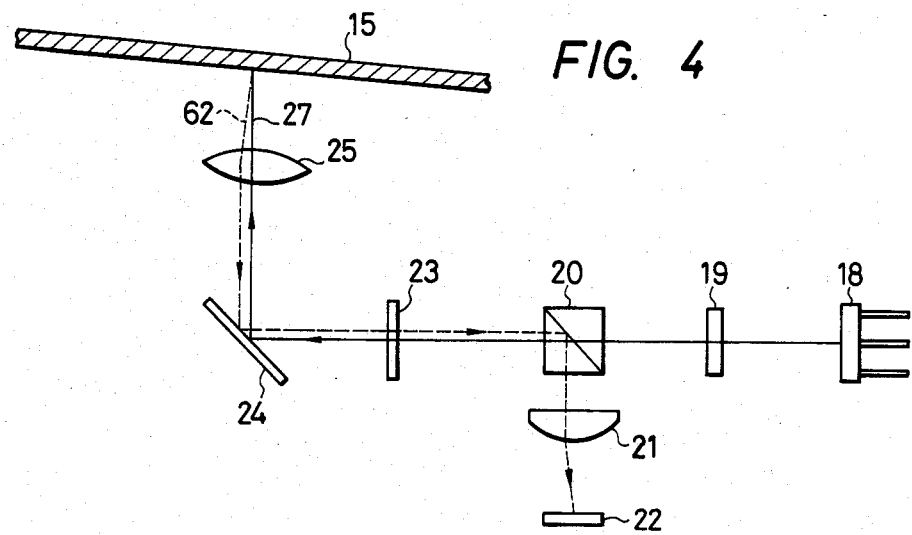
FIG. 4 is a view illustrating an optical system and a disc in the optical data reader of the invention.

Referring to FIG. 2, a recording disc 15 is set on a turntable (not shown) which is rotatably driven by a spindle motor (not shown), and is clamped thereto by a clamping mechanism (not shown) so that it rotates together with the turntable. The recording disc 15 is assumed to be deformed in a basin-like shape, specifically, an upwardly convex shape. On one side of the above-mentioned spindle motor a carriage 16, which acts as a holding mechanism, is arranged movably in the radial direction of the disc. Further, a drive device (not shown) is provided for driving the carriage 16. The carriage 16 carries an optical system for irradiating a laser beam onto the recording surface of the disc 15 and detecting changes in the amount of light reflected from the recording surface. As shown in FIG. 4, this optical system is composed of a laser diode 18, a diffraction grating 19, a beam splitter 20, a cylindrical lens 21, a light-detecting element 22 including three photodiodes, a quarterwave plate 23, a mirror 24, and an objective lens 25 used for converging the irradiating light beam and having an optical axis 27 directed to the disc recording surface.

Figure 3:
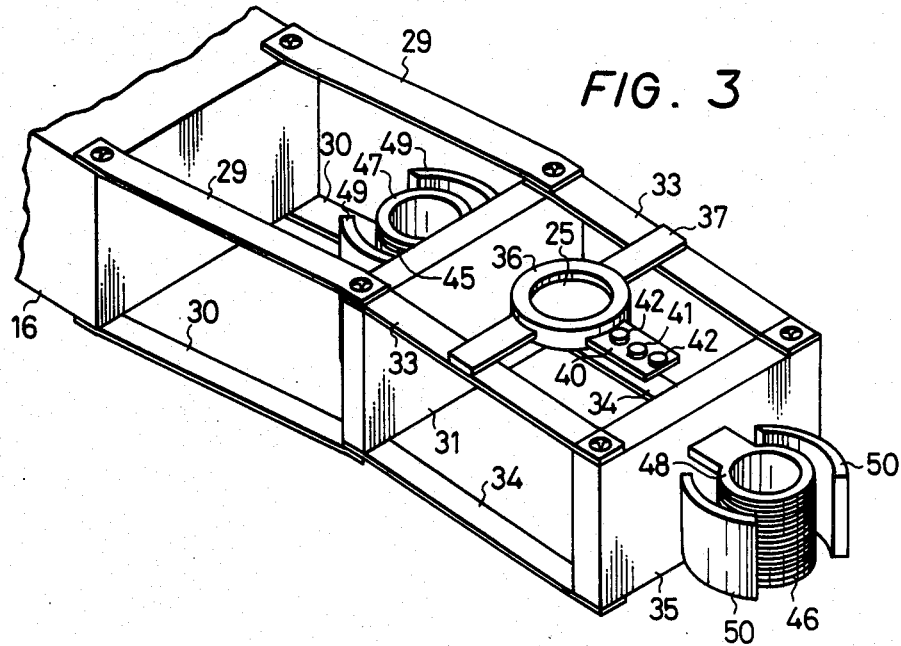

As shown in FIG. 3, two pairs 29 and 30 of first plate-like flexible members, secured at first ends thereof to the carriage 16, are spaced in the rotational axis direction of the recording disc 15 and extend perpendicularly to the rotational axis of the latter. The flexible members 29 and 30 are attached at their free ends to a rectangular first support member 31. Two pairs 33 and 34 of second plate-like flexible members are secured at first ends to the first support member 31, are spaced in the axial direction of the recording disc 15, extend substantially parallel to the first flexible members 29 and 30, and are secured at their other (free) ends to a second support member 35 formed in the same shape and made of the same material as the first support member 31. The objective lens 25 is carried by the pair of upper second flexible members 33 therebetween through the intermediary of a plate-like member 37 having a frame member 36 in its center section.

The above-mentioned first flexible members 29 and 30, the first support member 31, the second flexible members 33 and 34, and the second support member 35 (and related minor components) constitute a support for supporting the objective lens 25 so as to be rotatable and movable in a plane including the rotational axis of the recording disc 15.

It is noted that the support is not limited to the above-mentioned arrangement, but also can have an arrangement such that disc-like flexible members are used instead of the first flexible members 29 and 30, with the disc-like flexible members being supported at their peripheral sections by the carriage 16, and which have opening parts in their center sections and are formed therein with a plurality of concentric and circumferential corrugations. In such an arrangement, the first support member 31, the second support member 35 and the second flexible members 33 and 34 are supported at the peripheral edges of the above-mentioned opening parts of these flexible members. In other words, such flexible members may assume any form so long as support is provided for the objective lens 25 so that it is rotatable and movable in a plane including the rotational axis of the recording disc 15. However, the above-mentioned first flexible members 29 and 30, etc., are relatively inexpensive and simple in their structure and thus are preferred in that the support may be produced at a low cost. Also, in that case, the possibility of failure of the support is extremely low.

The frame member 36 in which the objective lens 25 is fitted is formed on its peripheral surface with a projecting part 40 on which an light-emitting diode 41 and a pair of photodiodes 42 are secured. The light-emitting diode 41 and the photodiodes 42 constitute a sensor which detects deviation in the relative angle between the optical axis 27 and the disc recording surface from the orthogonal and issues a detection signal should such deviation occur.

Figure 5:
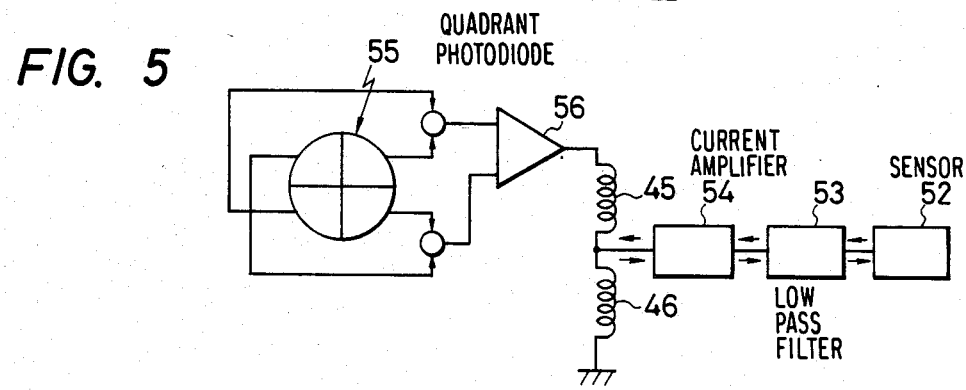
FIG. 5 is a view illustrating a block diagram of a servo system in the optical data reader of the invention.

Bobbins 47 and 48 onto which focussing coils 45 and 46 are wound are secured to the surfaces of the first and second support members in positions which are not opposed to one another. Further, the carriage 16 is secured with focusing magnets 49 and 50 arranged to oppose the focusing coils 45 and 46, respectively. As shown in FIG. 5, the sensor 52 composed of the light-emitting diode 41 and the photodiodes 42 is connected to the focussing coils 45 and 46 through a low-pass filter 53 and a current amplifier 54. Further, the focussing coils 45 and 46 are connected to a quadrant-type photodiode 55 for reproducing RF signals and producing focusing error signals through a differential current amplifier 56. The above-mentioned focusing coils 45 and 46, bobbins 47 and 48, focusing magnets 49 and 50, low-pass filter 53, and current amplifier 54 constitute the drive device for driving the objective lens in accordance with the detection signal delivered from the sensor 52 (the light-emitting diode 41, etc.). Further, the drive device and the above-mentioned support device, including the first flexible member 29, the sensor 52, and related peripheral members, together constitute a tilt servomechanism for maintaining the orthogonal relation between the optical axis 27 of irradiating light beam and the disc recording surface. Further, the components of the tilt servomechanism (excepting the low-pass filter 53 and the current amplifier 56) and the differential current amplifier 56 constitute a focusing servomechanism for moving the objective lens 25 parallel to the direction of the optical axis in accordance with a signal from the photodiode 55. That is, most of the components of both the focusing and tilt servomechanisms are used for both mechanisms.

Next, the operation of the optical data reader described above will briefly explained with reference to FIGS. 6 and 7.

When the carriage 16 reaches a position below a part of the disc recording surface which is deformed and therefore inclined, the optical axis 27 of the irradiating light beam deviates from the orthogonal relation with respect to the disc recording surface. This deviation in the orthogonal relation between the optical axis 25 and the disc recording surface is an angle $\theta$ in FIG. 2.

Then, the end face 58 of the carriage 16 (in parallel with the rotating axis of the disc), the first flexible members 29 and 30, and the first support member 31 are deformed so as to form a parallelogram. Further, the first support member 31, the second flexible members 33 and 34, and the second support member 35 also form a parallelogram. Accordingly, the center axes of the bobbins 47 and 48 are always maintained parallel to the rotational axis of the disc at any position. That is, the height of the center position of the straight line connecting between both bobbins 47 and 48 (which is accordingly the height of the objective lens 25) is determined by one-half of the sum of electrical currents which are fed to the focusing coils 45 and 46, and further, the inclination of the center axis of the objective lens 25 with respect to the rotational axis of the disc is determined by the difference between the above-mentioned electrical currents.

A signal issued from the sensor 52 which indicates a deviation in the orthogonal relation between the optical axis and the disc recording surface passes through the low-pass filter 53, and the low-range component of the current is fed to the focussing coil 46 through the current amplifier 54. Accordingly, the above-mentioned deviation in the orthogonal relation is reduced. When the above-mentioned deviation in the orthogonal relation is reduced, when the above-mentioned low-range component reaches a certain very small value $\Delta\psi$, equilibrium is established. At this time, if the gain of the current amplifier 53 is A, the output current value is $\Delta\psi A$. If the conversion factor of the stationary inclination (to the horizontal line) of the objective lens 25 with respect to the output current of the current amplifier 54 is K, equilibrium is established when $\Delta\psi AK = \theta - \Delta\psi$ since is in proportion to the current value if $\theta$ is extremely small. Since $\Delta\psi$ can be restrained below the level which offers no practical problem, with the above-mentioned arrangement, the parallel movement of the objective lens 25 in the direction of the optical axis 27 can be accomplished while the orthogonal relation between the optical axis 27 and the disc recording surface is maintained.

Figure 6:
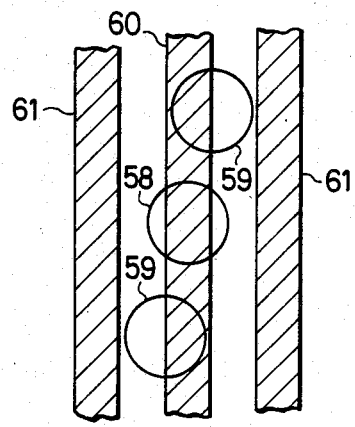
FIGS. 6 and 7 are diagrams used for explaining the operation of the optical data reader of the invention.
Figure 7:
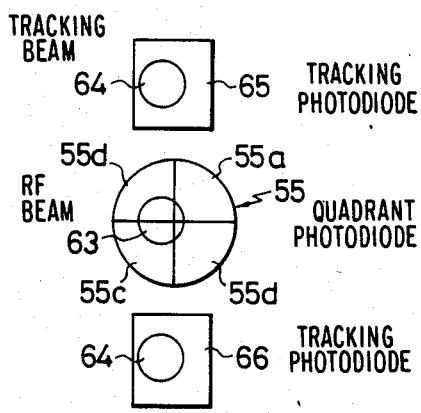

As mentioned above, by maintaining the optical axis 27 and the disc recording surface in an orthogonal relation, the beam spot 59 for reproducing RF signals and for tracking control on the disc recording surface is maintained in a precisely circular shape on a recording track 60 to be read, never extending to adjacent tracks 61, as shown in FIG. 6. Moreover, although the orthogonal relation between the optical axis 27 and the disc recording surface is corrected, some deviation between the optical axis 27 of irradiating light beam and the optical axis 62 of the light reflected from the disc recording surface may occur due to the corresponding movement of the objective lens 25 with respect to the disc recording surface, as shown in FIG. 4. Accordingly, as shown in FIG. 7, the beam spot 63 for reproduction of RF signals and the beam spot 64 for tracking control received on the light-detecting element 22 are shifted from the centers of the light-sensitive surfaces of the reproduction RF signal photodiode 55 and the tracking control photodiodes 65 and 66.

If the amounts of light received on the four parts 55a, 55b, 55c and 55d of the quadrant-type photodiode 55 are $L_a$, $L_b$, $L_c$ and $L_d$, respectively, and the amounts of light received on the tracking control photodiodes 65 and 66 are $L_e$ and $L_f$, respectively, the reproduced RF signal has a value proportional to $L_a+L_b+L_c+L_d$, while the tracking error signal has a value proportional to $L_e-L_f$. Further, the focussing error signal has a value proportional to $(L_a+L_c)-(L_b+L_d)$. Accordingly, if the beam spots 63 and 64 do not deviate out of the light receiving surface of the light-detecting element 22, the above-mentioned reproduced RF signal, tracking error signal, and focussing error signal are the same as those in the case where the recording disc is not deformed, and therefore the reproduction of RF signals and the functions of tracking servo and focussing servo are proper.

Further, in the above-described embodiment, the first flexible members 29 and 30 and the second flexible members 33 and 34 are provided in pairs. However, these first and second flexible members may be made single members. Further, the objective lens 25 is supported on the second flexible member 33. However, it may be attached to, for example, the first support member 31, the second support member 35, or the bobbin 47 or 48. Further, although, in FIG. 5 the focussing coils 45 and 46 are connected in series, these may be connected in parallel so as to be applied with a difference in current. Moreover, although the objective lens 25 is set in a middle position between the first support member 31 and the second support member 35, it may be supported in a position which is shifted from the middle position toward the first support member 31 or the second support member 35 so that the amount of movement of the objective lens 25 can be made large, corresponding to the amounts of movement of the bobbins 47 and 48.

In view of the above-mentioned detailed description, in the optical data reader according to the present invention, component members which constitute the focussing servomechanism are also used as component members of the tilt servomechanism, and therefore the cost of the optical data reader according to the present invention is greatly reduced in comparison with optical data readers which have been conventionally developed and in which the focussing servomechanism and the tilt mechanism are composed of members which are not commonly used for both mechanisms.

What is claimed is:

1. In an optical data reader comprising: an optical system including an objective lens; a holding mechanism for holding said optical system, said holding mechanism being movable in the radial direction of a disc; and a tilt servomechanism for maintaining an optical axis of an irradiating light beam directed from said optical system to a recording surface of said disc and said surface orthogonal to each other; the improvement wherein said tilt servomechanism comprises: support means for supporting said objective lens in such a manner as to be rotatable and movable in a plane including a rotational axis of said disc; detection means for detecting an angle between said optical axis and said recording surface of said disc and issuing a detection signal when said angle deviates significantly from the orthogonal; and drive means for driving said objective lens in accordance with said detection signal.

2. The optical data reader of claim 1, wherein said support means comprises at least a pair of first flexible members spaced in a direction of said rotational axis of said disc and extending substantially perpendicularly to said rotational axis, one end of said flexible members being secured to said holding mechanism; a first support member attached to free ends of said first flexible members; at least a pair of second flexible members spaced in said direction of said rotational axis and extending substantially parallel to said first flexible members with first ends thereof secured to said first support member; and a second support member secured to other ends of said second flexible members.

3. The optical data reader of claim 2, further comprising: a frame directly supporting said objective lens, and a pair of third flexible members connecting said frame to respective ones of said second flexible members.

4. The optical data reader of claim 3, further comprising: a second support member attached to free ends of said second flexible members, said third flexible members being connected to said second flexible members between said first and second support members.

5. The optical data reader of claim 4, further comprising: first and second bobbins coupled to said first and second support members, respectively; first and second focussing coils wound on said first and second bobbins, respectively; and first and second focussing magnets disposed around said first and second focussing coils respectively.

6. The optical data reader of claim 5, wherein said detecting means comprises a quadrant-type photodiode.

* * * * *